United States Patent
Murthy

(10) Patent No.: US 10,933,943 B2
(45) Date of Patent: Mar. 2, 2021

(54) UPHILL SLOPE HOLD AND START ASSISTANCE FOR ELECTRIC VEHICLES

(71) Applicant: NEUTRON HOLDINGS, INC., San Francisco, CA (US)

(72) Inventor: Nihal Murthy, San Francisco, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 0 days.

(21) Appl. No.: 16/244,042

(22) Filed: Jan. 9, 2019

(65) Prior Publication Data
US 2020/0216141 A1 Jul. 9, 2020

(51) Int. Cl.
*B60L 15/20* (2006.01)
*B62M 6/50* (2010.01)

(52) U.S. Cl.
CPC .......... *B62M 6/50* (2013.01); *B60L 15/2081* (2013.01); *B60L 2200/12* (2013.01)

(58) Field of Classification Search
CPC .... B62M 6/50; B60L 15/2081; B60L 2200/12
USPC .......................................................... 701/22
See application file for complete search history.

(56) References Cited

U.S. PATENT DOCUMENTS

| 5,376,869 A * | 12/1994 | Konrad | B60L 15/2009 318/587 |
| 6,580,188 B2 * | 6/2003 | Katagiri | B60L 58/25 310/67 A |
| 2018/0319457 A1 * | 11/2018 | Santucci | B62M 6/55 |

FOREIGN PATENT DOCUMENTS

WO    WO-2013041276 A2 *    3/2013    ............. B62M 6/45

* cited by examiner

*Primary Examiner* — Hunter B Lonsberry
*Assistant Examiner* — Daniel M. Robert
(74) *Attorney, Agent, or Firm* — Dentons US LLP

(57) ABSTRACT

This disclosure generally relates to an electric vehicle. More specifically, this disclosure describes a motor control system for an electric vehicle that activates and deactivates a hill hold assist mode and a hill start assist mode for the electric vehicle. The hill hold assist mode is used to help ensure the electric vehicle remains stationary while stopped on an uphill incline. Likewise, the hill start assist mode is used to help a rider of the electric vehicle start the electric vehicle moving again once it is stopped on the uphill slope.

17 Claims, 7 Drawing Sheets

UPHILL SLOPE HOLD AND START ASSISTANCE FOR ELECTRIC VEHICLES

BACKGROUND

Electric vehicles (e.g., scooters, bicycles, etc.), may be powered using a number of different methods. For example, an electric bicycle may be powered by an integrated motor and/or by a rider pedaling. Likewise, an electric scooter may be propelled by an integrated motor and/or a rider pushing off the ground. In either case, the rider typically has to exert some type of force for the electric vehicle to start moving.

SUMMARY

Electric vehicles (e.g., scooters, bicycles, etc.) may be propelled a number of different ways. For example, an electric bicycle may include an electric assist motor that propels the electric bicycle when power, provided by a power source (such as a rechargeable battery), is provided to the electric assist motor. The electric bicycle may also be propelled by a user pedaling.

Due to the additional hardware on the electric vehicle (e.g., the electric assist motor, brakes and/or various computing components), the electric vehicle may weigh more than a non-electric vehicle. For example, an electric bicycle may weigh more than a standard, non-electric, bicycle. The extra weight and/or type of brakes provided on the electric vehicle may make it difficult to maintain the electric vehicle in a stationary position and/or start the electric vehicle moving again from the stationary position—especially when the electric vehicle has stopped on an uphill slope.

Accordingly, the present disclosure describes a motor control system for an electric vehicle that detects when the electric vehicle has stopped on an uphill slope and causes an electric assist motor of the electric vehicle to hold the electric vehicle stationary (e.g., prevent the electric vehicle from rolling or otherwise moving backward down the uphill slope).

For example, the present disclosure describes a method for controlling an electric vehicle. The method includes receiving first sensor information from a brake sensor. In some examples, the first sensor information indicates a brake, associated with the brake sensor, has been actuated by a rider of the electric vehicle. The motor control system also receives second sensor information from a velocity sensor associated with an electric assist motor of the electric vehicle. In some examples, the second sensor information indicates a speed of the electric vehicle. Using the first sensor information and the second sensor information, the motor control system determines the electric vehicle has stopped on an uphill slope. In response, the motor control system of the electric vehicle instructs the electric assist motor to provide an amount of power to maintain the electric vehicle at a stationary position while the electric vehicle is stopped on the uphill slope.

The present application also describes a motor control system for an electric vehicle. The motor control system includes at least one processor and a memory coupled to the at least one processor. The memory stores instructions that are executable by the processor. The processor may receive information and control the overall operations of the motor control system. For example, the processor may receive sensor information from a plurality of sensors associated with the electric vehicle. Using the sensor information, the processor may determine the electric vehicle has stopped on an uphill slope. In response to determining the electric vehicle has stopped on an uphill slope, the processor provides a control signal that causes the electric assist motor to output an amount of power that prevents the electric vehicle from moving (e.g., moving backward) while stopped on the uphill slope.

The present application also describes a method for controlling an electric assist motor for an electric vehicle. In some examples, the method includes receiving sensor information from a plurality of sensors associated with the electric vehicle. The sensor information is used to determine whether the electric vehicle has stopped on an uphill slope. When it is determined the electric vehicle has stopped on the uphill slope, an electric assist motor is instructed to output a determined amount of power to prevent the electric vehicle from moving backward while stopped on the uphill slope.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
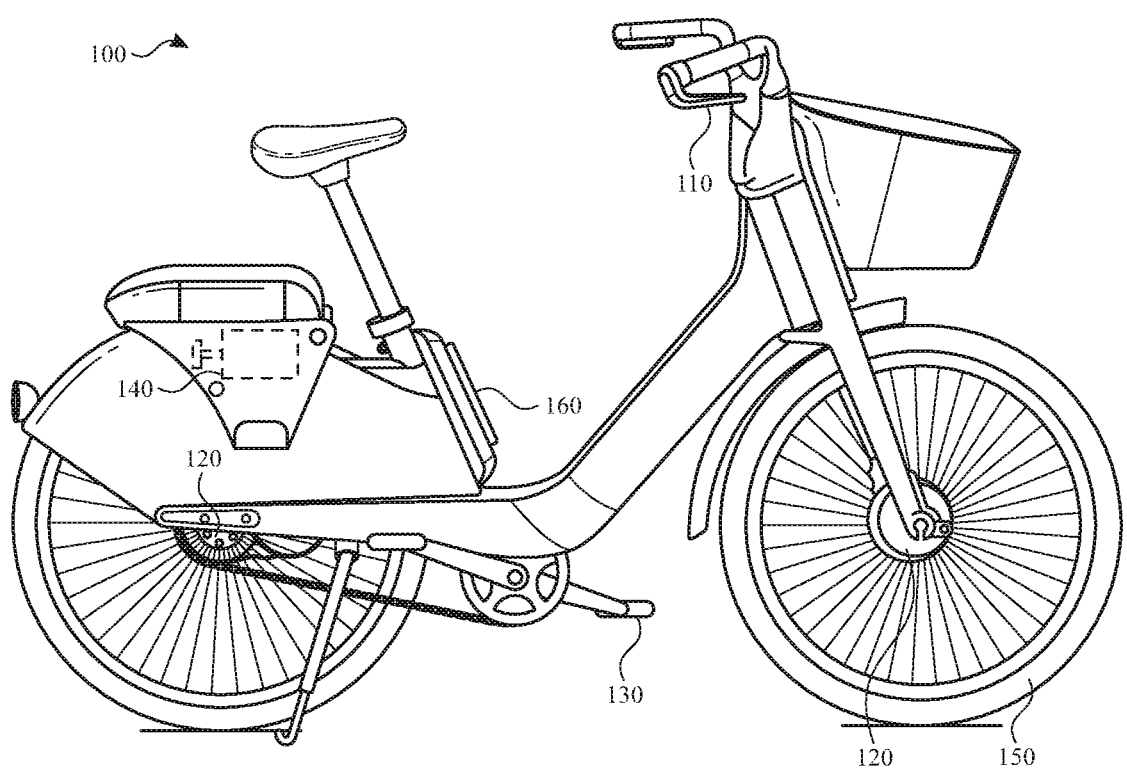
FIG. 1 illustrates an electric vehicle that may use a hill hold assist mode according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric vehicles, such as electric bicycles, may be propelled by an integrated motor (referred to herein as an electric assist motor), a rider pedaling the electric vehicle using, for example, pedals of the electric vehicle (referred to herein as pedal power), and/or a combination of an electric assist motor and pedal power. For example, a rider of the electric vehicle may pedal the electric vehicle for a first amount of time and/or for a first distance and utilize or otherwise engage the electric assist motor to maintain and/or increase a rate of speed at which the rider is traveling.

In some examples, brakes may be provided on one or more wheels of the electric vehicle. For example, an electric bicycle may include a brake on the front wheel, a brake on the back wheel, or brakes on both the front wheel and the back wheel. In some examples, drum brakes may be used on electric vehicles because they are durable and provide exceptional stopping power when the electric vehicle is traveling in a forward direction. However, one drawback of these brakes is that, in some cases, they do not provide adequate stopping and/or holding power for electric vehicles—especially when the electric vehicle has stopped on an uphill slope.

For example, when the electric vehicle is stopping or has stopped on an uphill slope, the drum brakes may be ideal for providing stopping power for the electric vehicle. However, once the electric vehicle has stopped on the uphill slope, the drum brakes may not be able to hold the electric vehicle stationary. That is, the drum brakes may not provide enough braking/holding power to prevent the electric vehicle from rolling backward down the uphill slope once the forward momentum/movement of the electric vehicle has ceased.

Accordingly, the present disclosure describes a motor control system of the electric vehicle that detects, using one or more sensors, whether the electric vehicle has stopped on an uphill slope. If the motor control system detects or otherwise determines, based on received sensor information from the one or more sensors, that the electric vehicle has stopped on an uphill slope, the motor control system may instruct the electric assist motor provide sufficient power to the electric vehicle to keep the electric vehicle stationary while it is stopped on the uphill slope.

For example, the electric vehicle may include a brake sensor associated with a brake and/or a brake lever. As the brake lever is activated by the rider, the brake sensor provides braking information to the motor control system indicating the rider wants to stop the electric vehicle. In some examples, the brake sensor determines whether the brake and/or the brake lever of the electric vehicle was actuated. In another example, the brake sensor is an analog brake sensor that provides additional information other than whether the brake and/or brake lever has been actuated. For example, the analog brake sensor can also determine a rate of application of the brake, an amount of travel of the electric vehicle once the brake lever has been actuated and/or once the brake has been applied to the electric vehicle. The electric vehicle may also include a velocity sensor that detects a speed and/or a velocity of the electric vehicle and/or a direction sensor that detects a direction of travel (e.g., forward or backward) of the electric vehicle.

If the information from one or more of these sensors indicate the electric vehicle is stopped on an uphill slope, but also that the vehicle may start to move backward or has started moving backward (e.g., due to the slope of the hill, the weight of the electric vehicle and/or gravity), the motor control system can instruct the electric assist motor to hold or maintain the electric vehicle at a stationary position. For example, the motor control system determines, based on the brake sensor information, the velocity sensor information and/or the direction sensor information, an amount of power the electric assist motor needs in order to counteract the backward movement of the electric vehicle. The motor control system then instructs the electric assist motor to provide the determined amount of power to the electric vehicle. The electric assist motor uses the power to engage one or more wheels of the electric vehicle and/or a drivetrain of the electric vehicle to counteract any backward movement.

Although electric bicycles and drum brakes are specifically mentioned, the examples described herein may be applied to any number of different electric vehicles that have any number of different types of brakes.

FIG. 1 illustrates an example electric vehicle 100 that may use a hill hold assist mode and/or a hill start assist mode such as described herein. Although the electric vehicle 100 is shown and described as an electric bicycle, the electric vehicle 100 may be any type of electric vehicle including, but not limited to, an electric scooter, an electric moped, etc.

The electric vehicle 100 includes various vehicle components (e.g., wheels, axles, chains, gears, bicycle seat, handlebar, bicycle frame, braking mechanisms, etc.), one or more electric assist motors, control systems, sensors, speakers, and/or lights, which may be powered by a power source. Some of these components will be discussed in greater detail herein.

In some examples, the electric vehicle 100 includes a first brake lever 110 and a second brake lever 115 positioned on a steering mechanism 120 (e.g., handlebars) of the electric vehicle 100. For example, the first brake lever 110 may be located on the left-hand side of the electric vehicle 100 and the second brake lever 115 may be located on the right-hand side of the electric vehicle 100.

The electric vehicle 100 may include a back brake 130 associated with a back wheel 150 of the electric vehicle 100. The electric vehicle 100 may also include a front brake 135 associated with a front wheel 155 of the electric vehicle 100. The back brake 130 may be activated when the first brake lever 110 is actuated by a rider of the electric vehicle 100 and the front brake 135 may be activated when the second brake lever 115 is actuated by the rider of the electric vehicle 100. Each brake lever 110/115 may be actuated in sequence, simultaneously or substantially simultaneously to slow down and/or stop the electric vehicle 100.

The electric vehicle 100 may also include one or more pedals 140. Using the pedals 140, the rider of the electric vehicle 100 can cause the electric vehicle 100 to move. As used herein, the term pedal power describes the act of a rider using the pedals 140 to propel the electric vehicle 100 forward.

The electric vehicle 100 may also include an electric assist motor 160. The electric assist motor 160 may provide power to the front wheel 155 of the electric vehicle 100, to the back wheel 150 of the electric vehicle 100, and/or to a drivetrain (e.g., the pedals 140, chain, and/or gears) of the electric vehicle 100.

In some examples, the electric assist motor 160 of the electric vehicle 100 is powered by a power source, such as, for example, a rechargeable battery 170. The rechargeable battery 170 may be electrically coupled to and removable from, the electric vehicle 100. In some examples, the rechargeable battery 170 is removably coupled to the electric vehicle 100 by a battery holster or other securement mechanism.

Figure 2:
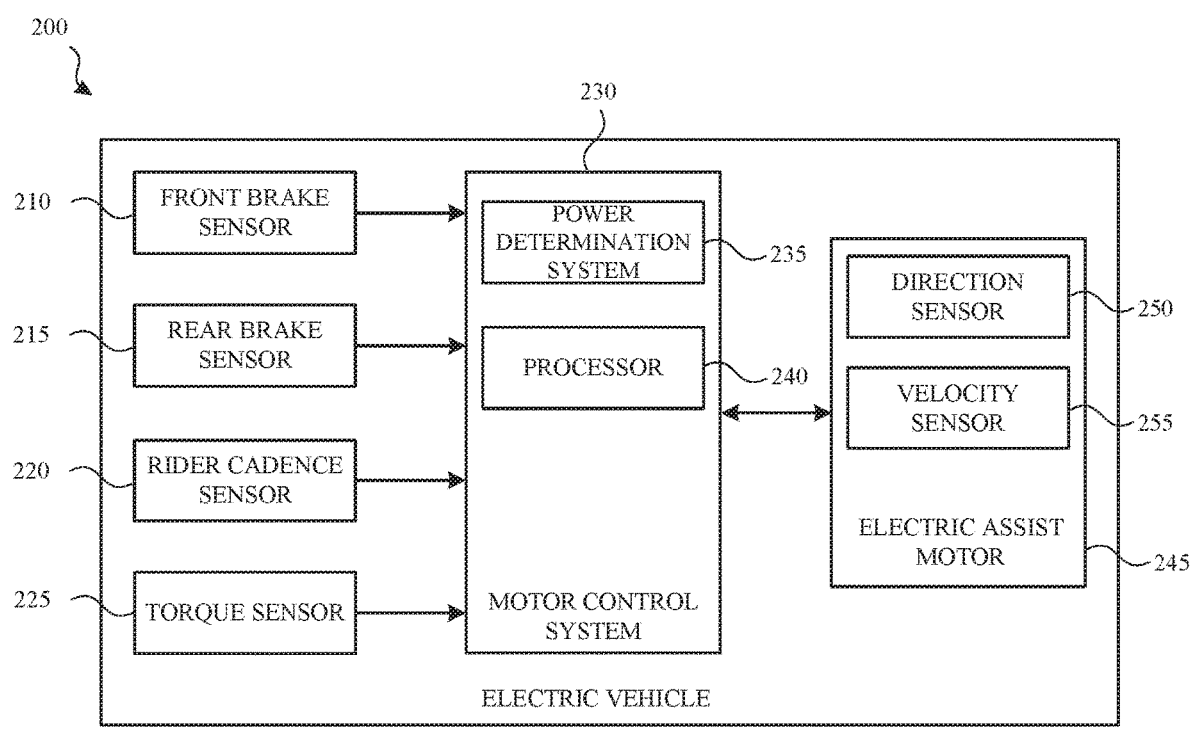
FIG. 2 is a system diagram that illustrates various components of an electric vehicle according to one or more examples.

FIG. 2 is a system diagram that illustrates various components and systems of an electric vehicle 200 according to one or more examples. In some examples, the electric vehicle 200 may be similar to the electric vehicle 100 (FIG. 1).

The electric vehicle 200 may include a motor control system 230 that monitors and/or controls various components and/or systems of the electric vehicle 200. For example, the motor control system 230 receives sensor information from a number of sensors positioned at various locations on the electric vehicle 200. The motor control system 230 can then determine, based at least in part on the sensor information, whether to activate a hill hold assist mode and/or a hill start assist mode.

In some examples, the motor control system 230 may activate the hill hold assist mode when information from one or more of the sensors indicate the electric vehicle 200 has stopped on an uphill slope. As used herein, the term uphill slope refers to a hill, an incline, a slope or any street, path or road that has a vertical gradient.

The hill hold assist mode keeps the electric vehicle 200 stationary and/or prevents the electric vehicle 200 from rolling backward when it is stopped on an uphill slope. For example, when the motor control system 230 determines the electric vehicle 200 has stopped on the uphill slope, a processor 240 of the motor control system 230 activates the electric assist motor 245 and causes the electric assist motor 245 to provide a determined amount of power to the electric vehicle 200 to keep the electric vehicle 200 stationary while it is stopped on the uphill slope.

Additionally, the motor control system 230 may activate a hill start assist mode when information from the one or more sensors indicate that the electric vehicle 200 has stopped on an uphill slope but is about to start moving again. For example, when the motor control system 230 determines the electric vehicle 200 has stopped on the uphill slope and the electric vehicle 200 is about to start moving or has started moving, a processor 240 of the motor control system 230 activates the electric assist motor 245 and causes the electric assist motor 245 to provide a determined amount of power to the electric vehicle 200 to assist a rider of the electric vehicle 200 to start moving the electric vehicle 200 on the uphill slope.

As briefly discussed, the motor control system 230 may activate the hill hold assist mode and/or the hill start assist mode in response to receiving sensor information from various sensors integrated or otherwise associated with the electric vehicle 200. For example, a front brake sensor 210 associated with a front brake (e.g., front brake 135) (FIG. 1) and/or a front brake lever (e.g., front brake level 115) (FIG. 1) of the electric vehicle 200 may provide a signal to the processor 240 that the front brake has been activated. A rear brake sensor 215 associated with a rear brake (e.g., rear brake 130) (FIG. 1) and/or a rear brake lever (e.g., rear brake lever 110) of the electric vehicle 200 may provide a signal to the processor 240 that the rear brake has been activated. A rider cadence sensor 220 may detect whether a rider of the electric vehicle 200 is pedaling the electric vehicle 200 and/or how fast the rider is pedaling the electric vehicle 200. A torque sensor 225 detects whether the rider is applying torque to the pedals/crank (e.g., pedals 140) (FIG. 1) of the electric vehicle 200. Although specific examples of sensors are given, the electric vehicle 200 may have additional sensors or fewer sensors.

The electric vehicle 200 may also include an electric assist motor 245. The electric assist motor 245 may provide power to a front wheel (e.g., front wheel 155) (FIG. 1) of the electric vehicle 200, a back wheel (e.g., back wheel 150) (FIG. 1) of the electric vehicle 200, and/or to a drivetrain (e.g., the pedals 140, chain, and/or gears) (FIG. 1) of the electric vehicle 200. For example, the electric assist motor 245 may augment or complement the pedal power provided by the rider by providing additional power to one of the wheels and/or the drivetrain of the electric vehicle 200. In another example, the electric assist motor 245 may propel the electric vehicle 200 without any pedal power. In yet another example, the electric assist motor 245 may be deactivated and the electric vehicle 200 may be powered by pedal power only.

The electric assist motor 245 may also provide power to one or more of the wheels and/or drivetrain of the electric vehicle 200 when the hill hold assist mode is activated. For example, when the hill hold assist mode is activated, a power determination system 235 associated or integrated with the motor control system 230 determines, based on additional sensor information (e.g., direction sensor 250 information and/or velocity sensor 255 information), an amount of power that the electric assist motor 245 of the electric vehicle 200 needs to output in order to keep the electric vehicle 200 stationary while it is stopped on an uphill slope.

In some examples, the hill hold assist mode is only activated when it is determined the electric vehicle 200 has stopped on an uphill slope. Accordingly, the motor control system 230 of the electric vehicle 200 may first determine whether the electric vehicle 200 is slowing down or has stopped. For example, the rider of the electric vehicle 200 may actuate a first brake lever and/or a second brake lever to slow and/or stop the electric vehicle 200. When the first brake lever and/or the second brake lever have been actuated, the front brake sensor 210 and/or the rear brake sensor 215 transmit brake actuation information to the motor control system 230 indicating the rider has activated the brakes.

In some examples, the motor control system 230 deactivates the electric assist motor 245 when the front brake sensor 210 and/or the rear brake sensor 215 indicate a brake of the electric vehicle 200 has been activated. When the electric assist motor 245 has been deactivated, the electric assist motor 245 does not provide additional power to the front wheel, the back wheel and/or the drive train of the electric vehicle 200. In some examples, the electric assist motor 245 remains deactivated until the front brake sensor 210 and/or the rear brake sensor 215 indicate that the rider of the electric vehicle has deactivated the brakes and/or until the rider cadence sensor 220 and/or the torque sensor 225 indicate that the rider is pedaling the electric vehicle 200.

Because the electric assist motor 245 may be deactivated when the brakes of the electric vehicle 200 have been activated, the motor control system 230 can determine whether to reactivate the electric assist motor 245 when the hill hold assist mode is activated. As such, the motor control system 230 may request and/or receive additional sensor information to help determine whether the electric vehicle 200 has stopped on an uphill slope.

In some examples, the additional sensor information requested and/or received by the motor control system 230 may be provided by one or more sensors associated with the electric assist motor 245. For example, the electric assist motor 245 may include or otherwise be associated with a direction sensor 250 and a velocity sensor 255. The direction sensor 250 may determine a direction of travel (e.g., forward or backward) of the electric vehicle 200. The velocity sensor 255 may determine a speed of the electric vehicle 200. In some examples, the velocity sensor 255 may determine a forward speed of the electric vehicle 200 and a backward speed of the electric vehicle 200. For example, if the electric vehicle 200 is moving forward, the forward speed may be indicated by a positive number. However, if the electric vehicle 200 is moving backward (e.g., rolling backward down an uphill slope), the backward speed may be a negative number.

The information from the direction sensor 250 and/or the velocity sensor 255 may be continuously sent to the motor control system 230, may be periodically sent to the motor control system 230 and/or be sent to the motor control system 230 in response to one or more conditions being met. For example, if the front brake sensor 210 and/or the rear brake sensor 215 indicate the rider has activated the brakes of the electric vehicle 200, the motor control system 230 may periodically request velocity information from the velocity sensor 255. In other examples, the velocity sensor 255 may continuously send velocity information to the motor control system 230. In yet other examples, the velocity sensor 255 may send velocity information to the motor control system 230 only when the detected velocity of the electric assist motor 245 is below a threshold (e.g., one mile per hour or less) and/or when the velocity is zero or is approximately zero.

The motor control system 230 may use the brake sensor information and/or the velocity sensor information to determine the electric vehicle 200 has stopped. Once the determination is made, the motor control system 230, using information from the direction sensor 250 and/or the velocity senor 255, determines whether the electric vehicle 200 has stopped on an uphill slope.

In some examples, the uphill slope stop determination is made when the direction sensor 250 provides an indication to the motor control system 230 that the electric vehicle 200 is moving or starting to move in a backward direction—even if/when the brakes of the electric vehicle 200 are activated. In another example, motor control system 230 may determine the electric vehicle 200 is stopped on an uphill slope when the velocity sensor 255 provides a negative number for the speed information. The negative number may indicate the electric vehicle 200 is moving or is starting to move in a backward direction—even if/when the brakes of the electric vehicle 200 are activated.

In another example, when the brake sensor information is received (indicating the rider has activated the brakes of the electric vehicle 200), the motor control system 230 may request or otherwise receive information from the rider cadence sensor 220 and/or the torque sensor 225. Depending on the information from one or more of these sensors, the motor control system 230 may activate the hill hold assist mode.

For example, when the motor control system 230 receives an indication from the front brake sensor 210 and/or the rear brake sensor 215 that the electric vehicle 200 is slowing or has stopped, the motor control system 230 may request and/or receive rider cadence information from the rider cadence sensor 220. In some examples, the rider cadence sensor 220 determines a pedaling rate of the rider of the electric vehicle 200. Thus, if the rider cadence sensor 220 detects that a user is not pedaling and the front brake sensor 210 and/or the rear brake sensor 215 indicate the rider is also applying the brakes, the motor control system 230 may determine that the electric vehicle 200 is going to stop. In such cases, the processor 240 of the motor control system 230 may deactivate the electric assist motor 245.

In another example, the motor control system 230 may request and/or receive torque sensor information from a torque sensor 225 of the electric vehicle 200 when the front brake sensor 210 and/or the rear brake sensor 215 indicate that the brakes of the electric vehicle 200 have been activated. The torque sensor 225 detects whether the rider is applying torque to the pedals/crank of the electric vehicle 200. If torque is not detected, or if the detected amount of torque is below a threshold, the motor control system 230 may determine the electric vehicle is coming to a stop. In such cases, the processor 240 of the motor control system 230 may deactivate the electric assist motor 245.

Although the examples described above mention specific sensors and sensor information to determine whether the electric vehicle 200 has or is stopped on an uphill slope, the motor control system 230 may use sensor information from various other types of sensors to make this determination or otherwise reinforce the determination. For example, the motor control system 230 may use an accelerometer to determine whether the electric vehicle 200 has stopped on an uphill slope. In another example, the electric vehicle 200 may use Global Positioning System (GPS) information to determine a location of electric vehicle 200 and, based on the location information, determine whether the electric vehicle 200 is stopped on an uphill slope.

In some examples, the motor control system may use a combination of different sensor information to determine, prior to the electric vehicle 200 stopping, that the electric vehicle 200 is on an uphill slope. Thus, when the electric vehicle 200 eventually stops on the uphill slope, the hill hold assist mode may be automatically activated.

For example, the velocity sensor 255 may periodically and/or continuously track a speed of the electric vehicle 200. If the speed of the electric vehicle 200 decreases a threshold amount over a given time period without the brakes being activated, the motor control system 230 may determine the electric vehicle 200 is on an uphill slope. The motor control system 230 may also be able to determine a gradient of the uphill slope based on the detected decrease in speed. This information may be used by the motor control system 230 and/or the power determination system 235 to determine how much power the electric assist motor 245 needs to provide to keep the electric vehicle 200 stationary on the uphill slope.

In another example, the torque sensor 225 may detect the rider is on an uphill slope based, at least in part, on an amount of torque that is provided to one or more pedals of the electric vehicle 200. For example, if a detected amount of torque is above a torque threshold, the motor control system 230 may determine the rider of the electric vehicle 200 is traveling up an uphill slope. In some examples, the information from the torque sensor 225 may be combined with the information from the velocity sensor 255.

In yet another example, the rider cadence sensor 220 may provide information that the pedaling cadence of the rider has changed or has slowed. This information, either by itself or when combined with the information provided by the torque sensor 225 and/or the information provided by the velocity sensor 255, may indicate that the electric vehicle 200 is on an uphill slope.

In another example, the motor control system 230 may determine an amount of power being used by the electric assist motor 245. If the amount of power being used by the electric assist motor 245 is above a threshold, the motor control system 230 may determine the electric vehicle 200 is traveling on an uphill slope. In some examples, this information may be combined with the information provided by the torque sensor 225, the information provided by the velocity sensor 255, the information provided by the rider cadence sensor 220 and/or the brake sensor information provided by the front brake sensor 210 and/or the rear brake sensor 215.

In some examples, information from the rider cadence sensor 220 and/or the torque sensor 225 may be requested when the front brake sensor 210 and/or the rear brake sensor 215 have been activated for over a threshold amount of time. For example, if the front brake sensor 210 and/or the rear brake sensor 215 indicate the brakes have been active for five seconds or more, the motor control system 230 may determine the electric vehicle 200 is stopping or has stopped. When the threshold amount of time has been reached, the motor control system 230 may request and/or receive the additional sensor information from the rider cadence sensor 220, the torque sensor 225, the direction sensor 250 and/or the velocity sensor 255.

The motor control system 230 also includes a power determination system 235. The power determination system 235 may use the received sensor information to determine how much power the electric assist motor 245 needs to provide to the electric vehicle 200 to prevent the electric vehicle 200 from moving backward when the electric vehicle 200 is stopped on the uphill slope. For example, the power determination system 235 may determine the electric assist motor 245 needs to provide a first amount power to the electric vehicle 200 based on a detected backward movement speed of the electric vehicle 200. In other examples, the power determination system 235 may determine the electric assist motor 245 needs to provide a second amount of power to the electric vehicle 200 based on an amount of torque detected by the torque sensor 225. In another example, the power determination system 235 may determine the electric assist motor 245 needs to provide a third amount of power to the electric vehicle 200 based on an amount of torque detected by the torque sensor 225 and based on a detected backward movement speed of the electric vehicle 200.

For example, in order to prevent the electric vehicle 200 from rolling backward down the uphill slope, the rider may apply an amount of torque to one of the pedals of the electric vehicle 200. In yet other examples, the power determination system 235 may use information from the velocity sensor 255 and information from the torque sensor 225 to determine an amount of power required to keep the electric vehicle 200 stationary when it is stopped on an uphill slope.

In yet other examples, the power determination system 235 may receive rider profile information from a network service over the internet or other communication channel. The rider profile information may include a height of the rider, the weight of the rider, an experience skill of the rider and so on. The power determination system 235 may use the profile information, alone or in combination with other sensor information, to determine an amount of power required to keep the electric vehicle 200 stationary.

When the power determination system 235 determines the amount of power required to keep the electric vehicle 200 stationary, the processor 240 may instruct the electric assist motor 245 to provide the determined amount of power to one or more of the front wheel, the back wheel and/or the drivetrain of the electric vehicle 200.

The motor control system 230 may also determine whether the hill hold assist mode should be deactivated. For example, the motor control system 230 may receive information from the front brake sensor 210 and/or the rear brake sensor 215 that the rider has released or deactivated the brakes of the electric vehicle 200. Alternatively or additionally, the motor control system 230 may receive information from the torque sensor 225 that the rider has applied or is applying torque to the pedals of the electric vehicle 200. Using this information, the processor 240 of the motor control system 230 may determine the rider wants the electric vehicle 200 to start moving and as such, will deactivate the hill hold assist mode.

In another example, the motor control system 230 may include a hill start assist mode to assist the rider to start moving the electric vehicle 200 after the electric vehicle 200 has stopped on an uphill slope. In some examples, the hill start assist mode may only be activated when the hill hold assist mode has been previously activated and deactivated. For example, the hill start assist mode may only be activated if the electric vehicle determines, based on the examples above, that it has stopped on an uphill slope and that the hill hold assist mode was activated. In some examples, the hill start assist mode will only be activated when the hill hold assist mode was activated/deactivated within a predetermined amount of time. For example, the hill start assist mode will only be activated if the hill hold assist mode was activated or deactivated within the last five seconds or less, within the last ten seconds or less, within the last fifteen seconds or less, etc.

To activate the hill start assist mode, the motor control system 230 may receive information from the front brake sensor 210 and/or the rear brake sensor 215 that the rider has released the brakes of the electric vehicle 200. The motor control system 230 may also receive information from the torque sensor 225 that the rider has applied torque to one or more of the pedals of the electric vehicle 200. When this information is received, the motor control system 230 may request and/or receive additional sensor information to determine an amount of power that the electric assist motor 245 should provide to the electric vehicle 200 to assist the rider to start moving the electric vehicle 200 on the uphill slope. For example, the motor control system 230 may request and/or receive additional sensor information from the rider cadence sensor 220 and/or the velocity sensor 255. The additional sensor information may be used by the power determination system 235 to determine an amount of power that the electric assist motor 245 should provide to the electric vehicle 200 to help ensure a smooth start for the rider while starting the electric vehicle 200 on the uphill slope.

Figure 3A:
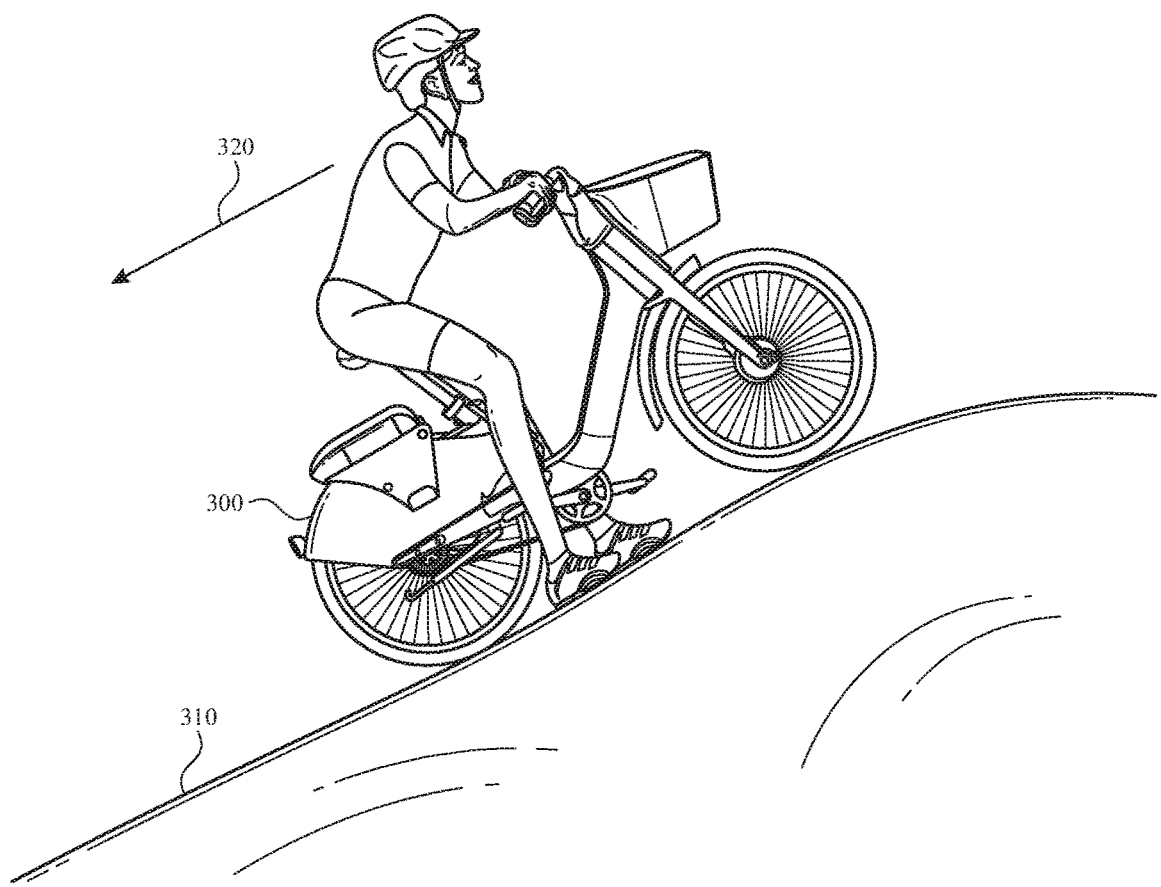
FIGS. 3A-3C illustrate an electric vehicle that may use a hill hold assist mode and/or a hill start assist mode when the electric vehicle has stopped on an uphill slope according to one or more examples.
Figure 3B:
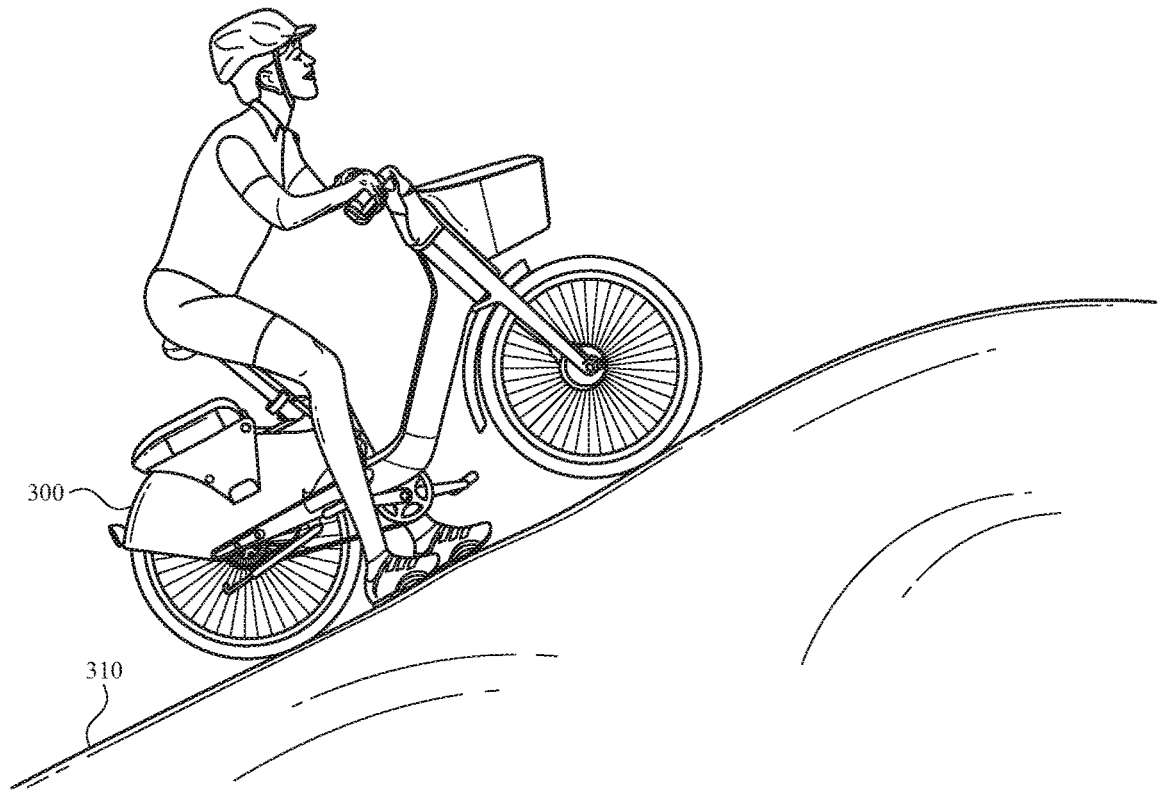
Figure 3C:
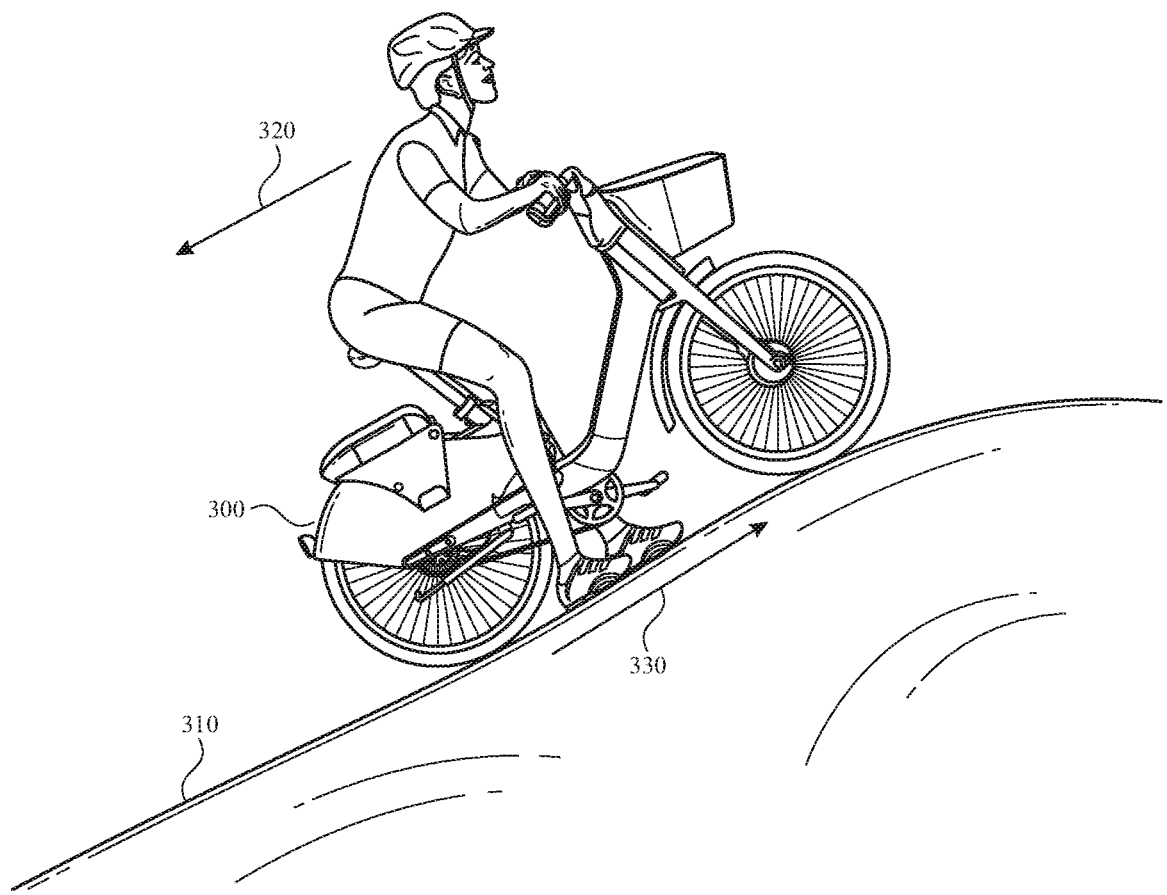

FIGS. 3A-3C illustrate how a hill hold assist mode of an electric vehicle 300 prevents the electric vehicle 300 from rolling backward down an uphill slope 310 when the electric vehicle 300 has stopped on the uphill slope 310 according to one or more examples. In some examples, the electric vehicle 300 may be similar to the electric vehicle 100 (FIG. 1) and/or the electric vehicle 200 (FIG. 2) described herein.

For example and as shown in FIG. 3A, a rider of the electric vehicle 300 may stop the electric vehicle 300 on an uphill slope 310. Once the electric vehicle 300 has stopped, the electric vehicle 310 may begin to roll backward down the uphill slope 310 in the direction of arrow 320 (shown in FIG. 3B). The electric vehicle 300 may roll backward due to one or more of the gradient of the uphill slope 310, the weight of the electric vehicle 300 and/or gravity. In other examples, the brakes of the electric vehicle 300, while providing adequate stopping power for forward momentum, may not be able to keep the electric vehicle 300 stationary while it is stopped on the uphill slope.

To prevent the electric vehicle 300 from moving backward down the uphill slope 310, a motor control system (e.g., motor control system 230) (FIG. 2) receives sensor information to determine: 1) whether a hill hold assist mode of the electric vehicle 300 should be activated; and 2) an amount of power that an electric assist motor (e.g., electric assist motor 245) (FIG. 2) should provide to the electric vehicle 300 to keep the electric vehicle 300 stationary and/or prevent the electric vehicle 300 from rolling backward on the uphill slope 310 when it is stopped.

For example, a motor control system of the electric vehicle 300 may initially activate a hill hold assist mode when one or more brake sensors (e.g., front brake sensor 210 and/or rear brake sensor 215) (FIG. 2) indicate that one or more brakes of the electric vehicle 300 have been activated (e.g., by the rider of the electric vehicle 300). When the brakes have been activated, the motor control system determines whether the electric vehicle 300 has stopped. In some examples, a velocity sensor (e.g., velocity sensor 255) (FIG. 2) associated with the electric assist motor may provide velocity information to the motor control system.

If the one or more brakes are activated and the motor control sensor has provided an indication that the electric vehicle 300 has stopped, and then subsequently indicates the electric vehicle 300 is not stationary (e.g., the electric vehicle 300 is moving backward), the motor control system may activate the hill hold assist mode. As part of this process, a power determination system (e.g., power determination system 235) (FIG. 2) may determine, based on received sensor information, how much power the electric assist motor needs to provide to the electric vehicle 300 in order to prevent the electric vehicle 300 from rolling backward down the uphill slope 310.

When the amount of power is determined, the motor control system may activate or otherwise instruct the electric assist motor to provide the determined amount of power to the electric vehicle 300. As shown in FIG. 3C, the amount of power (indicated by directional arrow 330) may counteract the backward movement of the electric vehicle 300 (indicated by directional arrow 320). As such, the electric vehicle 300 will remain stationary on the uphill slope 310 when the electric vehicle 300 has stopped on the uphill slope 310.

Figure 4:
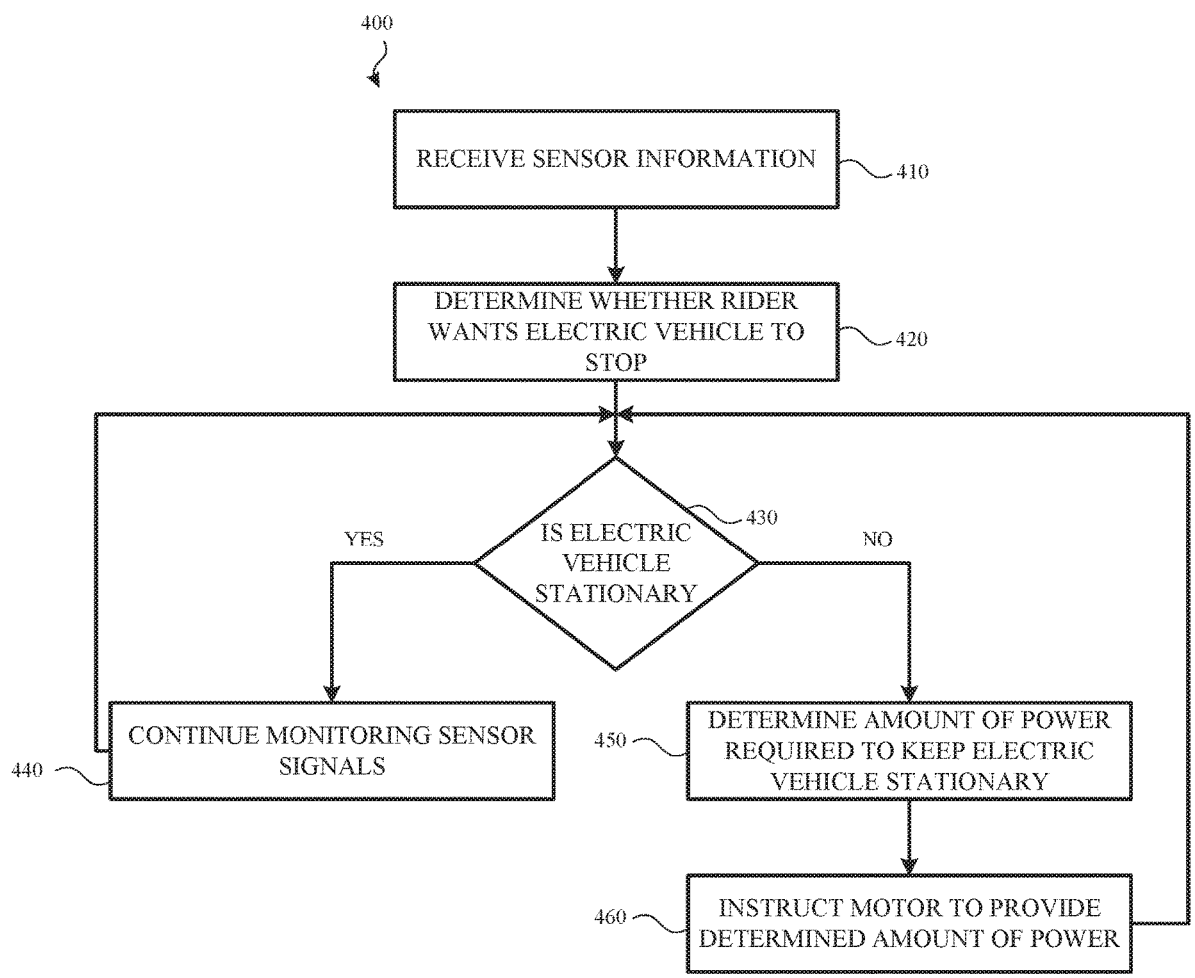
FIG. 4 illustrates a method for activating a hill hold assist mode for an electric vehicle when the electric vehicle is stopped on an uphill slope according to one or more examples.

FIG. 4 illustrates a method 400 for activating a hill hold assist mode for an electric vehicle according to one or more examples. The method 400 may be implemented by a motor control system 230 (FIG. 2) of an electric vehicle as described herein.

The method 400 begins when the motor control system receives (410) sensor information that indicates the hill hold assist mode of the electric vehicle should be activated. In some examples, the sensor information may include brake activation information from one or more brake sensors. In other examples, the information may include velocity information from a velocity sensor. Although specific sensors are mentioned, information from other sensors may be received by the motor control system and used to determine whether the hill hold assist mode of the electric vehicle should be activated.

Using the sensor information, the motor control system may determine (420) whether a rider of the electric vehicle wants to stop the electric vehicle. In some examples, the motor control system may determine the rider of the electric vehicle wants to stop the electric vehicle based on periodically receiving and/or monitoring brake actuation information and/or velocity information. For example, the brake actuation information may indicate the brakes of the electric vehicle have been activated for a predetermined amount of time (e.g., five seconds) and/or that the brakes of the electric vehicle are currently activated. As such, the motor control system may determine the rider wants to stop the electric vehicle. In another example, if the velocity information indicates that a velocity of the electric vehicle is approaching zero or has reached zero, the motor control system may determine the rider wants to stop the electric vehicle.

When the motor control system determines the electric vehicle has stopped, the motor control system may determine (430) whether the electric vehicle is stationary. In some examples, this determination is made only while the brakes are still activated (e.g., the rider is activating the brakes) and/or the electric vehicle has stopped.

As described herein, information from one or more sensor may be used to determine whether the electric vehicle is stopped or is stationary. For example, the motor control system may receive and/or request velocity sensor information from a velocity sensor and/or travel direction information from a direction sensor. If the travel direction information and/or velocity sensor indicates the electric vehicle is starting to move backward or is otherwise not stationary, the motor control system determines (450) an amount of power that should be provided by an electric assist motor of the electric vehicle in order to keep the electric vehicle stationary. In some examples, the amount of power provided by the motor control system is based, at least in part, on the received sensor information. For example, the motor control system may determine a first amount of power is required to keep the vehicle stationary based on a detected backward movement speed of the electronic vehicle.

When the required amount of power to keep the electric vehicle stationary is determined, the motor control system instructs (460) the electric assist motor to provide the determined amount of power to the electric vehicle. In some examples the motor control system may continuously monitor (shown by the directional arrow extending from operation 460) sensor information to determine whether the vehicle is stationary until a determination is made that the rider wants the electric vehicle to start moving again.

If the motor control system determines 430 the electric vehicle is stationary, the motor control system continues to monitor (440) the sensor information. As discussed herein, the motor control system may continuously monitor the sensor information while the electric vehicle is stopped. For example, the motor control system may continuously monitor (shown by the directional arrow extending from operation 440) additional sensor information only when one or more brakes of the electric vehicle are activated and/or when a determination of whether the hill hold assist mode of the electric vehicle should be activated or deactivated.

Figure 5:
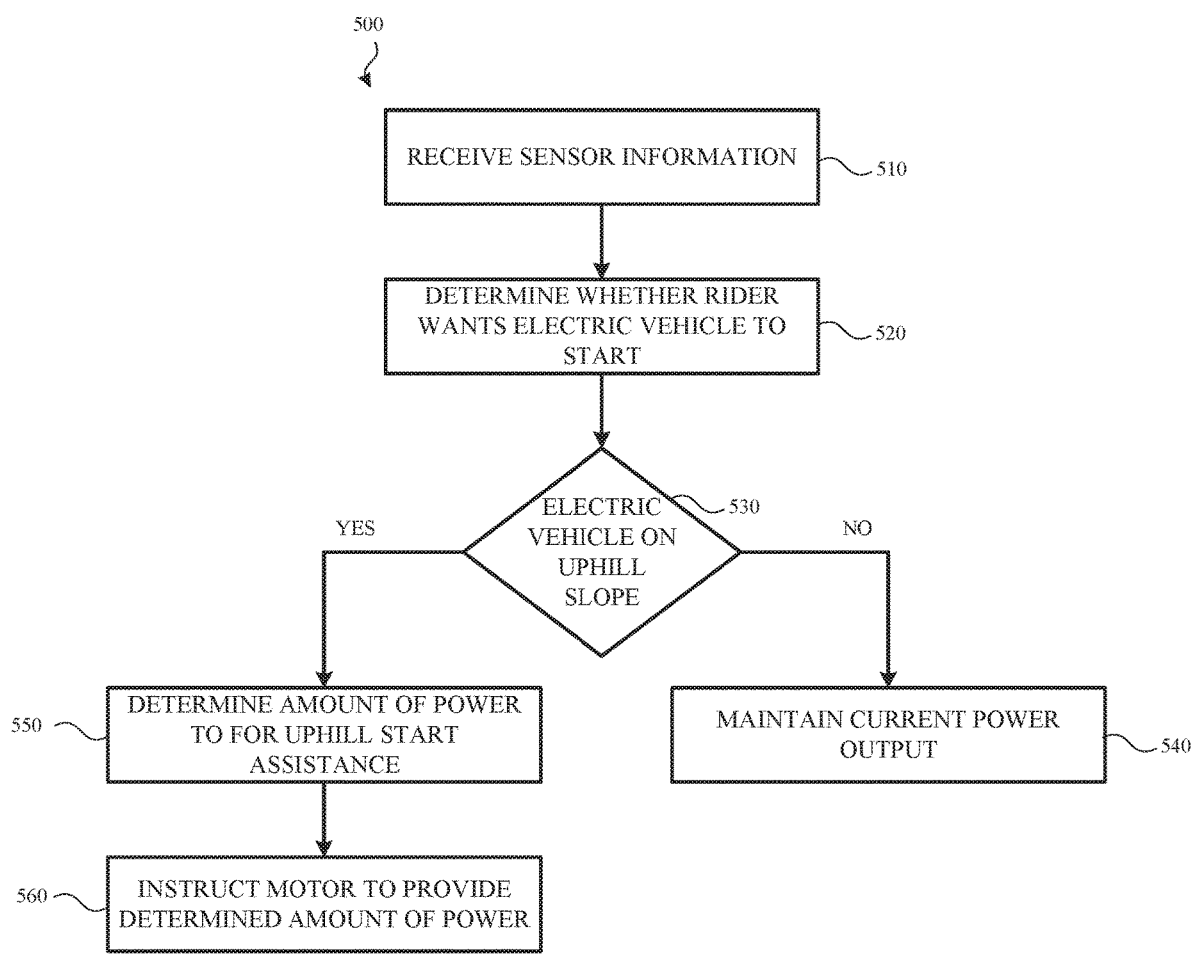
FIG. 5 illustrates a method for activating a hill start assist mode for an electric vehicle when the electric vehicle is stopped on an uphill slope according to one or more examples.

FIG. 5 illustrates a method 500 activating a hill start assist mode for an electric vehicle when the electric vehicle has stopped on an uphill slope according to one or more examples. In some examples, the method 500 may be used by a motor control system of an electric vehicle such as described herein.

The method 500 begins when the motor control system receives (510) sensor information that indicates that an activated hill hold assist mode should be deactivated. In some examples, the sensor information may include brake deactivation information (e.g., the rider of the electric vehicle has released one or more brake levers of the electric vehicle) from one or more brake sensors. In other examples, the information may include velocity information from a velocity sensor, torque information (e.g., an indication that the rider is applying torque to one or more pedals of the electric vehicle) from a torque sensor, electric motor direction information from a direction sensor and/or rider cadence information from a rider cadence sensor. Although specific sensors are mentioned, information from other sensors may be received by the motor control system and used to determine whether the hill hold assist mode should be deactivated.

Using the sensor information, the motor control system may determine (520) whether the rider of the electric vehicle wants the electric vehicle to start moving from its stopped position. In some examples, the motor control system may determine the rider wants the electric vehicle to start moving based on periodically receiving and/or monitoring brake actuation information and/or velocity information. For example, the brake actuation information may indicate the brakes of the electric vehicle have been deactivated. As such, the motor control system may determine the rider intends to start moving the electric vehicle. In another example, if the velocity information indicates a velocity of the electric vehicle is beginning to increase from zero, the motor control system may determine the rider wants the electric vehicle to start moving. In yet another example, a torque sensor associated with the electric vehicle may detect or determine an amount of torque the rider is providing on one or more pedals of the electric vehicle. Using this information, the motor control system may determine the rider of the electric vehicle wants the electric vehicle to start moving from its stopped position.

When the motor control system determines the rider of the electric vehicle wants the electric vehicle to start moving, the motor control system may determine (530) whether the electric vehicle is stopped on an uphill slope. In some examples, this determination is made based on whether a hill hold assist mode was previously activated. In other examples, this determination may be made by monitoring torque information from a torque sensor, motor direction information from a direction sensor, velocity information from a velocity sensor and/or brake activation information from one or more brake sensors.

If the motor control system determines, based on the received sensor information, the electric vehicle is not on a hill, the motor control system causes the electric assist motor of the electric vehicle to maintain (540) its current power output. In some examples, if the motor control system determines the electric vehicle is not on a hill, the motor control system will not provide any instructions to the electric assist motor—at least with respect to activating the hill start assist mode.

However, if the motor control system determines the electric vehicle is on an uphill slope, the motor control system determines (550) an amount of power the electric assist motor needs to apply to assist the rider to start moving the electric vehicle. As described herein, information from one or more sensor may be used to determine whether the electric vehicle is stopped on an uphill slope and/or how much power should be provided by the electric assist motor.

For example, the motor control system may receive and/or request velocity sensor information from a velocity sensor and/or travel direction information from a direction sensor. If the travel direction information and/or velocity sensor indicates that the electric vehicle is starting to move backward or is otherwise not stationary, the motor control system determines, based at least in part, on the information provided by the velocity sensor (or other sensors) an amount of power that should be provided by an electric assist motor of the electric vehicle in order to keep the electric assist vehicle stationary and/or start to move in a forward direction.

When the required amount of power to start the electric vehicle moving in a forward direction is determined, the motor control system instructs (560) the electric assist motor to provide that power to the electric vehicle.

Figure 6:
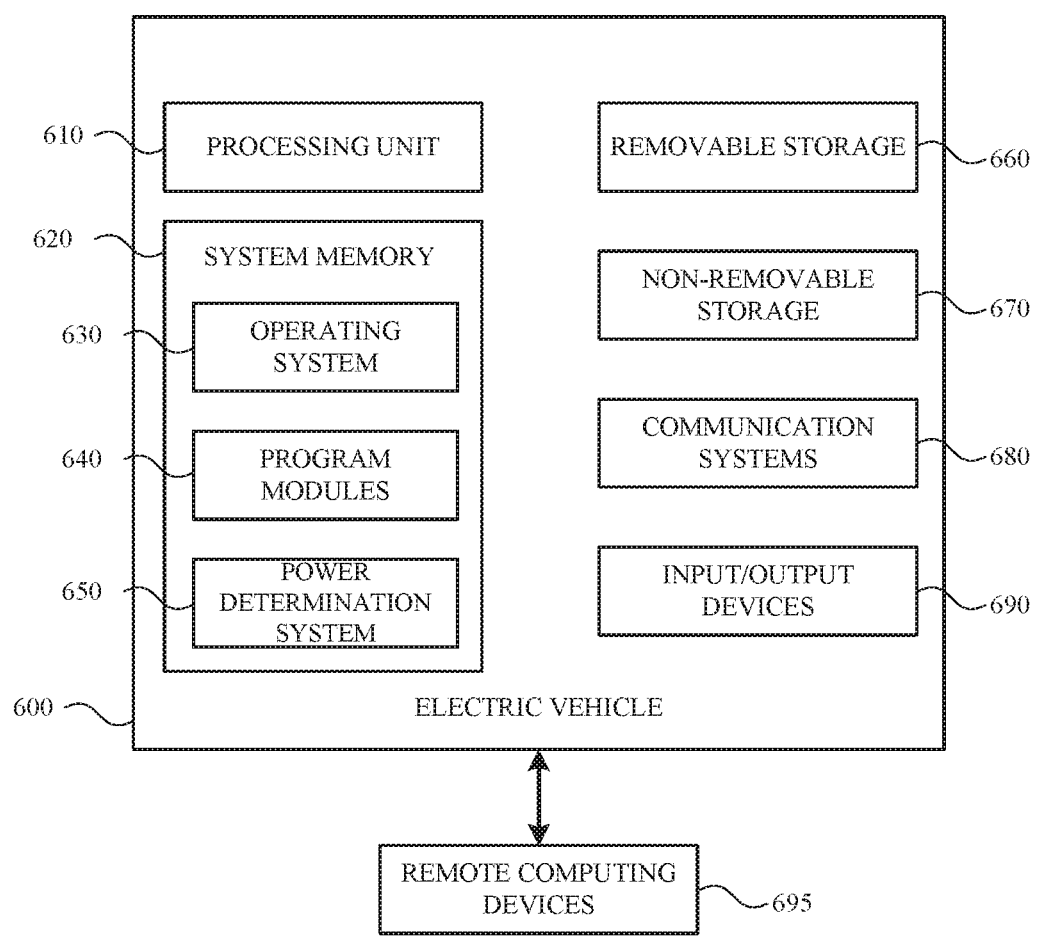
FIG. 6 is a system diagram of various components for the electric vehicle described herein.

FIG. 6 is a system diagram of an electric vehicle 600. More specifically, FIG. 6 illustrates physical components (e.g., hardware) of the electric vehicle 600 with which aspects of the disclosure may be practiced. The components of the electric vehicle 600 described below may be integrated with the electric vehicles described herein.

The electric vehicle 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that control the operation of the electric vehicle 600 and one or more program modules 640. The program modules 640 may be responsible for gathering sensor information, determining whether the hill hold assist mode and/or hill start assist mode is or should be activated etc. The memory may also include a power determination system 650 that determines and amount of power that the electric assist motor of the electric vehicle 600 needs to output in order to keep the electric vehicle 600 stationary when it is stopped on an uphill slope.

The electric vehicle 600 may also have additional features or functionality. For example, the electric vehicle 600 may include additional data storage devices (e.g., removable and/or non-removable storage devices) such as, for example, magnetic disks, optical disks, or tape. These additional storage devices are labeled as a removable storage 660 and a non-removable storage 670.

A number of different program modules and data files may be stored in the system memory 620. While executing on the processing unit 610, the program modules 640 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the electric vehicle 600 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The electric vehicle 600 may include one or more communication systems 680 that enable the electric vehicle to communicate with rechargeable batteries, remote computing devices 695, a network service and the like. Examples of communication systems 680 include, but are not limited to, radio frequency (RF) transmitter, receiver, and/or transceiver circuitry, a Controller Area Network (CAN) bus, a universal serial bus (USB), parallel, and/or serial ports.

The electric vehicle 600 may also have one or more input devices and/or one or more output devices shown as input/output devices 690. These input/output devices 690 may include a keyboard, a sound or voice input device, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electric vehicle 600. Any such computer storage media may be part of the electric vehicle 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for controlling an electric assist motor for an electric bicycle, comprising:
   receiving, by a motor control system of an electric bicycle, first sensor information from a brake sensor, the first sensor information indicating that a brake associated with the brake sensor has been actuated;
   receiving, by the motor control system of the electric bicycle, second sensor information from a velocity sensor associated with an electric assist motor of the electric bicycle, the second sensor information indicating a velocity of the electric bicycle;
   receiving, by the motor control system of the electric bicycle, third sensor information from a rider cadence sensor, the third sensor information indicating a pedaling rate of the rider of the electric bicycle;
   determining, by the motor control system of the electric bicycle, using the first, second, and third sensor information, that the electric bicycle is stopped on an uphill slope; and
   determining, by the motor control system of the electric bicycle, the electric assist motor to provide an amount of power to maintain the electric bicycle at a stationary position while the electric bicycle is stopped on the uphill slope.

2. The method of claim 1, wherein the amount of power prevents the electric bicycle from moving backward while the electric bicycle is stopped on the uphill slope.

3. The method of claim 1, further comprising:
   determining, by the motor control system of the electric bicycle and based, at least in part, on the second sensor information, the amount of power provided by the electric assist motor to maintain the electric bicycle at the stationary position.

4. The method of claim 1, further comprising:
   receiving, by the motor control system of the electric bicycle, fourth sensor information from a direction sensor associated with the electric assist motor of the electric bicycle, the fourth sensor information indicating a direction of travel of the electric bicycle.

5. The method of claim 4, further comprising:
   determining, by the motor control system of the electric bicycle and based, at least in part, on the second sensor information and the fourth sensor information, the amount of power provided by the electric assist motor to maintain the electric bicycle at the stationary position.

6. The method of claim 1, further comprising:
   receiving, by the motor control system of the electric bicycle, fifth sensor information from a torque sensor associated with the electric bicycle, the fifth sensor information indicating an amount of torque applied to one or more pedals of the electric bicycle.

7. The method of claim 6, further comprising:
   determining, by the motor control system of the electric bicycle and based, at least in part, on the second sensor information and the fifth sensor information, the amount of power provided by the electric assist motor to maintain the electric bicycle at the stationary position.

8. The method of claim 6, further comprising:
   determining, by the motor control system of the electric bicycle and based, at least in part, on the first sensor information, the second sensor information and the fifth sensor information, a second amount of power provided by the electric assist motor to cause the electric bicycle to begin moving after the electric bicycle has stopped on the uphill slope.

9. A motor control system for an electric bicycle, comprising:
   at least one processor; and
   a memory coupled to the at least one processor and storing instructions that, when executed by the at least one processor, causes the at least one processor to:
      receive first sensor information from a brake sensor, the first sensor information indicating that a brake associated with the brake sensor has been actuated;
      when the first sensor information indicates that the brake sensor has been activated for over a threshold amount of time, request and receive second sensor information from a plurality of other sensors of the electric bicycle;

determine, based at least in part, on the first and second sensor information, whether the electric bicycle has stopped on an uphill slope; and in response to determining the electric bicycle has stopped on the uphill slope, instruct an electric assist motor to output an amount of power to prevent the electric bicycle from moving while stopped on the uphill slope.

10. The motor control system of claim 9, wherein the second sensor information includes velocity information.

11. The motor control system of claim 9, further comprising instructions for:

determining the amount of power provided by the electric assist motor to prevent the electric bicycle from moving while stopped on the uphill slope.

12. The motor control system of claim 9, further comprising instructions for:

determining, based on additional sensor information, whether the electric bicycle is starting to move after having stopped on the uphill slope.

13. The motor control system of claim 12, further comprising instructions for:

determining a second amount of power provided by the electric assist motor to assist the electric bicycle to start to move after having stopped on the uphill slope.

14. The motor control system of claim 12, wherein the additional sensor information is torque sensor information associated with one or more pedals of the electric bicycle.

15. A method for controlling an electric assist motor for an electric bicycle, comprising:

receiving first sensor information from a brake sensor, the first sensor information indicating that a brake associated with the brake sensor has been actuated;

when the first sensor information indicates that the brake sensor has been activated for over a threshold amount of time, requesting and receiving second sensor information from a plurality of other sensors of the electric bicycle;

determining, based at least in part, on the first and second sensor information, whether the electric bicycle has stopped on an uphill slope; and when it is determined the electric bicycle has stopped on the uphill slope, instructing an electric assist motor to output a determined amount of power to prevent the electric bicycle from moving backward while stopped on the uphill slope.

16. The method of claim 15, wherein the sensor information includes velocity information.

17. The method of claim 15, further comprising:

instructing the electric assist motor to output a second determined amount of power to assist the electric bicycle to start moving on the uphill slope.

* * * * *